3,380,904
Patented Apr. 30, 1968

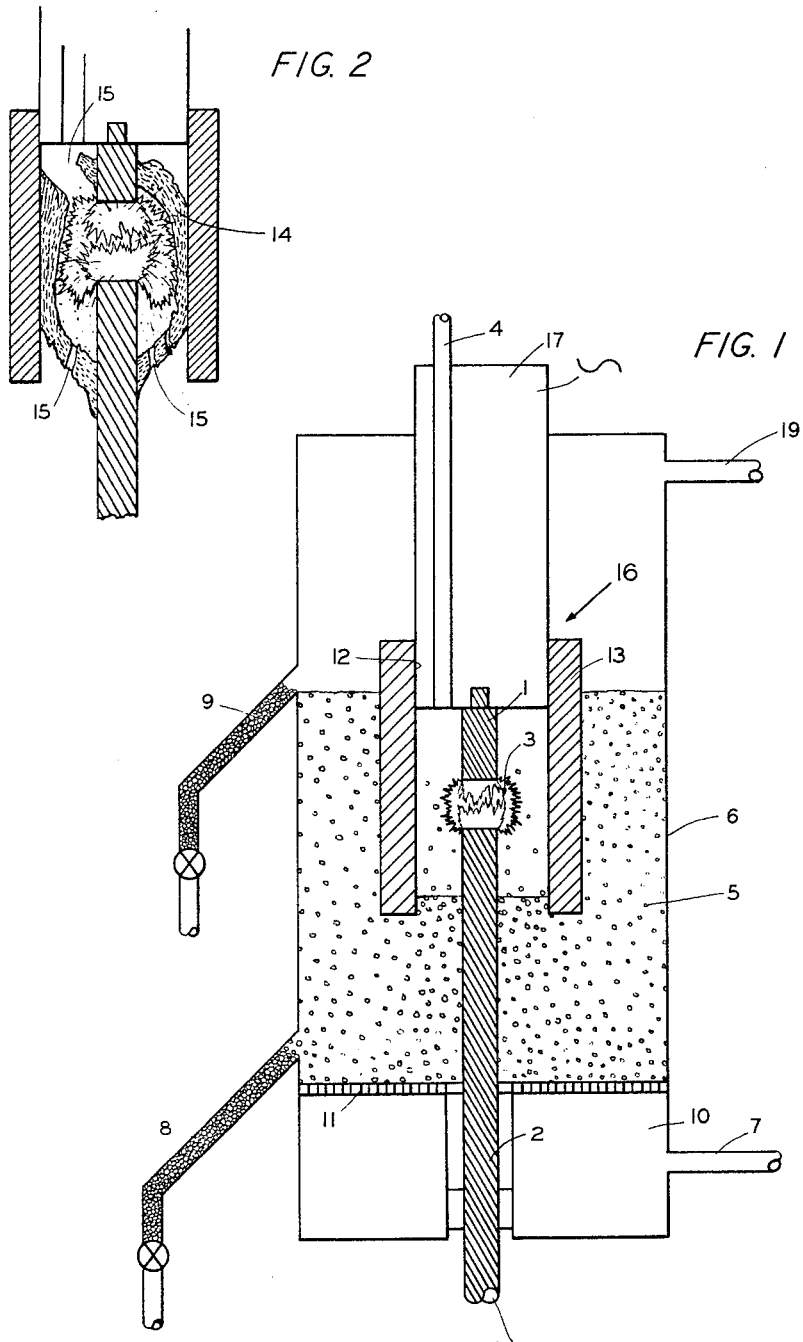

3,380,904
CONFINING THE REACTION ZONE IN A PLASMA ARC BY SOLIDIFYING A CONFINING SHELL AROUND THE ZONE
William M. Goldberger, Columbus, Ohio, assignor, by mesne assignments, to The Development Corporation, Columbus, Ohio, a corporation of Delaware
Filed Apr. 20, 1965, Ser. No. 449,468
15 Claims. (Cl. 204—164)

This invention relates to improvements in the utilization of a plasma arc and relates in particular to a method and apparatus for increasing the reaction time during plasma-arc chemical-reaction processes involving solid reactants.

In the utilization of a plasma arc as a high-temperature source for solid reactant chemical reactions, it is difficult to bring particulate solid reactants into intimate contact with or close proximity to the arc for sufficient periods of time for efficient chemical conversion. The high temperature of the plasma arc precludes the confining of the arc or reaction zone in a manner to materially increase retention time. Reactant particles entrained in a carrier gas directed into the high-temperature zone generated by the arc pass rapidly through this zone reducing the completeness of the reaction.

Presently available plasma-arc reaction devices are capable of sustaining particulate solid chemical reactants in the arc reaction zone for periods of time in the order of milliseconds. Such a short time is frequently inadequate to effect a complete and efficient reaction. I have found it to be possible to effect a reaction time of up to several minutes by employing the method and apparatus of the present invention. Chemical reactions once considered impossible or impractical because of the inability to impart sufficient thermal energy to the reactants by conventional plasma arc practices may be readily performed by the method and apparatus of the present invention.

In general, the present invention is an apparatus and method whereby, in addition to reactants, flux and slag forming particulate materials are deposited within the reaction zone of the plasma arc during high-temperature plasma reactions. Such materials are disposed to become molten within said zone and deposit and solidify on surrounding structures so as to build up a shell of slag and flux deposits that surround and confine the reaction zone. This shell has a molten inner surface which entraps particulate reactants within the high-temperature zone of the plasma arc acting as a flux to enhance the reaction and serving to materially increase the average retention time of the reactant in the reaction zone. Particular reactants which do not contact or become entrapped in molten inner surface of the flux and slag shell are forced to flow into the arc or into close proximity to the arc by the slag and flux shell so that they are exposed to the higher temperature of the plasma generator.

Preferred apparatus for carrying out the process of the present invention consists of a plasma generator constructed of spaced electrodes for forming an electric arc therebetween enclosed in a housing. At least one entry port enters the housing preferably above the high-temperature reaction zone created by the arc for introducing reactants (usually entrained in a gaseous carrier). The housing is additionally provided with at least one opening below the reaction zone for conducting the products of reaction from the generator. The inner walls of the housing are spaced from the reaction zone so that the particulate slag and flux forming materials brought into intimate contact with the high-temperature reaction zone deposit on the inside walls of the housing forming the desired slag and flux shell structure. Means are provided outside of the housing for collecting the products of the reaction and means are provided for cooling the housing walls.

It has been discovered that a particularly efficient and consequently preferred means for cooling the housing walls and maintaining a degree of temperature control for a plasma generator not possible by conventional cooling means is to position the plasma arc and housing within a fluidized bed. The fluidized bed also acts as an ideal cooling or quenching media for the reaction products emitted from the housing and these products may be readily removed from a fluidized-bed chamber.

The fluidized-bed particles tend to enter the housing through the reaction product exit opening and penetrate the reaction zone itself. Consequently, the fluid-bed particles themselves may be utilized as the flux and slag shell-forming media.

The source of shell-forming particles may conveniently come from either the particulate material of the fluidized bed and/or may be introduced into the housing through an entry port with a carrier gas either alone or in combination with the reactants.

A particularly desirable apparatus which falls within the scope of the present invention is shown by the drawings in which:

FIG. 1 is an illustrative cross-sectional view of a plasma arc, fluid-bed apparatus; and FIG. 2 is a fragmentary cross-sectional view of the plasma device of FIG. 1 showing a formed slag shell.

In FIG. 1 an arc is shown to be generated between electrodes 1 and 2 effecting a high-temperature reaction zone shown generally at 3. Within the arc or reaction zone 3 there are temperature gradients wherein the highest temperatures are within the arc and progressively lower temperatures extend outwardly from the arc engulfing the inside area of the housing 16. Direct (DC) or alternating (AC) current may be used to generate such an arc.

Reaction zone 3 is encompassed by the housing 16 which consists of an annular concentric sleeve 13 and an enlarged supporting portion 17 of electrode 1. Enlarged supporting portion 17 of electrode 1 encloses the top of sleeve 13. A feed tube and entry port 4 opens through supporting portion 17 to the interior of housing 16.

Particulate solids and gaseous reactants are introduced into housing 16 through entry port 4 so as to be within the reaction zone 3. Such reactants will pass downwardly through the open bottom end of sleeve 13 (or housing 16) passing rapidly through the reaction zone. However, if the slag and flux forming particulate materials are introduced through port 4 along with the reactants, a portion of such material will enter the reaction zone 3, become molten and deposit and freeze to the inside walls 12 of the sleeve 13 to build up a slag shell 14 such as is shown by FIG. 2.

It will be noted that slag shell 14 not only grows inwardly from the inner wall 12 of sleeve 13 but also forms an enclosing bottom around electrode 2 and a top around electrode 1. As a result of the gaseous flow from the entry port 4 passing downwardly through reaction zone 3, the cone remains sufficiently porous leaving voids 15 at both the top and bottom so as to enable passage of the reactants from port 4 into the shell 14 and exit of the reaction products.

The slag shell is known to have a molten surface during operation, since when cooled the surface of the shell adjacent to reaction zone has a fused glass-like appearance. Reactants introduced through entry port 4 entrained in a carrier gas enter the cone 14 through voids 15 and a large portion are entrapped in the inner molten surface of the cone where they are held and exposed to the high temperature of the plasma generator for a relatively extended period of time. Thus, complete reaction of these particles is insured. Particles not so entrapped are forced by the confining effects of cone 14 into close proximity with the high-temperatures of the arc. Thus, the average action time and completeness of reaction is significantly enhanced by the method and apparatus of the present invention. Additionally, contact of the particles with the molten inner surface of the slag shell provides a desirable fluxing action which enhances and promotes a complete chemical reaction.

The shell growth has no adverse effects on the stability of the arc.

In the embodiment of FIGS. 1 and 2, sleeve 13 and electrodes 1 and 2 (including enlarged portion 17) are all constructed of graphite. Although this material is highly resistant to heat, it will be appreciated that housing 16 and particularly sleeve 13 must be cooled both to sustain the equipment and maintain temperature control. As previously stated, the inside surface of sleeve 13 must be at a lower temperature than the temperature of solidification of the flux and slag shell-forming materials. An ideal cooling temperature control of this apparatus has been found to be a fluidized bed. The plasma apparatus of FIG. 1 is shown to be positioned within a fluidization chamber 6. A fluidized bed of particles 5 is maintained by gases entering the plenum area 10 at the bottom of the chamber 6 through gas inlet 7. The fluidizing gas which enters the plenum area 10 is evenly distributed by a perforated distributor plate 11 as it enters the chamber 6 to evenly fluidize the particles 5. The particles 5 engulf the housing 13 and act as a highly efficient cooling means.

The fluidizing gas along with the reaction products from housing 16 which pass from the open end of sleeve 13 and are quenched in the fluidized bed exit for the fluidizing chamber through an exit port 19. The reaction products are recovered from the fluidizing gas by well-known means.

The temperature of the fluidized bed is readily controlled by a fluid-heat exchanger system (not shown) or other well-known fluidized-bed temperature-control means.

As stated above, particles 5 may be utilized as the slag-flux shell building agent. In this event, the particles must be of an appropriate material that will melt in the high temperatures of the reaction zone 3 and deposit and freeze on the inner walls 12 of the sleeve member 13. If the fluidized bed engulfs the housing 16 sufficient particles 5 will penetrate sleeve member 13 into the vicinity of the reaction zone 3 to perform this function (as shown).

During continuous operation, the slag deposit on the inside surface 12 of the concentric sleeve 13 accumulates and grows inwardly toward the higher temperatures of the reaction zone 3. Growth of the shell occurs only at temperature below the melting point of the slag or flux particles. As a result the shell grows only to a thickness where the inside surface reaches a temperature zone where the slag-forming material becomes molten. At that point, melting of the slag occurs and molten droplets of the slag run downwardly and out of housing 16. Such droplets may freeze and become a part of the fluidized bed. Larger particles gravitate to the lower regions of the bed and are removed through a solid drain 8. Particulate solids of the fluidized bed may also be withdrawn at overflow 9 to maintain a constant volume of fluidized-bed particles.

Sleeve 13 is preferably of a diameter that the inside surface 12 is spaced from the arc flowing between electrodes 1 and 2 at a greater distance than the gap between the electrodes so that the arc does not deviate from the electrode 2 to the sleeve. Means (not shown, but well-known in the art) may be employed for adjusting the vertical position of one of the electrodes 1 or 2 so as to control the size of the arc gap. In this eventuality if the slag or flux shell-building particles are of a substantially nonconductive material the spacing between the inner walls of cylinder 13 and the electrodes become less critical since after the arc has been initiated, the shell of frozen flux agent will electrically insulate the inner wall 12 of sleeve 13 from the arc and the gap may exceed the difference between the electrodes and the inner housing wall. The gap between the electrodes may exceed the spacing between the electrodes and the sleeve if sleeve 13 is substantially nonelectrically conductive.

The spacing between electrodes 1 and 2 and the inside surface of sleeve 13 should not be too great, since the slag particles may freeze before depositing on the surface 12 and, if a shell is formed, too much time may be required in effecting sufficient shell buildup to adequately confine reactants entrapped on the inner molten surface to the higher temperatures of reaction zone 3. This distance, however, is dependent on the size of electrodes employed and in the characteristics of the arc utilized. In large commercial units, the electrodes may well be as large as 30 inches in diameter and may have a gap which could vary from 4 to 12 inches. In such installations it would not be desirable to space the inner walls 12 further than about 18 inches from the electrodes' surface. Generally such spacing will vary from about ½ to 3 times the distance of the vertically adjusted gap between the electrodes during operation of the generator.

The slag or shell-building material of the present invention must be a material that will melt or fuse when subjected to the temperatures of the reaction zone but which will freeze when deposited on the surrounding wall structures. Thus, the preferred materials are dependent upon the exact reaction and the wall temperatures involved. Plasma arcs may be utilized to generate almost any temperature in excess of 2500° F. up to about 50,000° K. Thus, a wide variety of flux or slag shell-forming materials may be used. Preferred slag-forming materials, for high-temperature plasma-arc application are the stable oxides particularly metal oxides such as $SiO_2$, $MgO$, $Al_2O_3$, $Cr_2O_3$ etc. and stable carbides particularly metal carbides such as silicon carbides, calcium carbide, vanadium carbide, tungsten carbide, tantalum carbide, and titanium carbide. Other particulate refractory material which become molten at such high temperatures may also be useful, for example, the particulate refractory metals themselves may be employed as the slag and flux shell-forming materials in some instances where the temperature of reaction is at or above the melting temperature of the metal and the temperature of the surrounding walls is below such temperature.

An ideal slag and flux shell-forming material is one that will melt at the reaction zone temperatures but which solidifies at a temperature that is but a few degrees (F.) below the reaction zone temperature. Such a material preferably possesses a low-vapor pressure so that it does not vaporize while in the reaction zone.

The particle size of such shell-forming materials is not critical but is most conveniently a particle size which may be readily brought into the reaction zone by a carrier gas or a fluidized bed in the manner described above. Fluidized-bed particles may be of any size depending on the velocity of the fluidizing gases. Practical consideration dictate a fluidized bed of particles ranging from about −8 to +325 mesh. The preferred particle size of shell-forming materials introduced into housing 16 by means of a carrier gas through port 4 would be within the same particle size range.

In some instances the reaction itself may be utilized to generate the flux and slag shell-forming materials. For example, when converting tricalcium phosphate to elemental phosphorus the carrier gas and/or fluidizing gas may be carbon monoxide, in which event tricalcium silicate forms in addition to elemental phosphorus in a molten or vapor state and by controlling the temperature of the inner walls of the housing by means of fluidized bed cooling media, tricalcium silicate may be caused to deposit and form the desired slag and flux shell formation.

It is obvious from the above description that the flux and slag shell-forming material may be conveniently brought into contact with the arc reaction zone by one of a plurality of means or any combination of such means. For example, it may be desirable to bring slag and flux shell-forming materials into contact with the plasma-arc by both introducing it into housing 16 through an entry port 4 while simultaneously immersing the generator in a fluidized bed of slag or shell-forming particles so that these particles will also enter the reaction zone and contribute to the shell formation. Additionally, reaction products consisting of slag and shell-forming materials may be generated in the reaction zone to effect shell formation or contribute to such shell formation in combination with one or more of the other means.

Reactant particles and/or slag and shell-forming particles may be physically introduced into the generator through port 4 so that they gravitate through the generator into the arc or reaction zone. However, preferably such particles will be entrained in a carrier gas. The carrier gas employed to convey entrained reactants and/or slag and flux shell-forming particles, into housing 16 through port 4 may be any gas that will not have an adverse effect on the reactions taking place. Such a gas can be an inert gas such as argon but may be a gas such as carbon monoxide that is compatible to the reaction taking place.

The gaseous flow creating the fluidized bed may also be any gas that does not adversely affect the reaction or react with the reaction products. Such a gas in many instances may be air, an inert gas such as argon or a reactive gas which advantageously enters into the reaction taking place.

As examples of the utility and novelty of the method and apparatus of the present invention elemental phosphorus was liberated from tricalcium phosphate by apparatus and under conditions such as those depicted and described above. In the apparatus, two ½ inch diameter graphite electrodes located along the vertical centerline of the plasma-arc furnace apparatus were used to establish an A-C arc in a gap of about ½ inch between the ends of the electrodes. The arc gap was positioned within a 2 inch ID (inside diameter) graphite sleeve which was open at the lower end. The feed solids and carrier gas used for feeding entered the sleeve at the top through a graphite electrode holder. The gases from the arc zone which comprised the feed gas and the gases generated by the reaction (essentially carbon monoxide, CO) left the sleeve at the lower end where they came into direct contact with the fluidized solids in the bed. Unreacted solids and residue solids also left the arc zone at the lower end of the sleeve.

During the initial series of reaction experiments, the solids feed rate was varied while holding the power level at 1.6–2.0 kw. Other process conditions were constant. The following conversion of phosphorus fed as tricalcium phosphate to elemental phosphorus was measured.

TABLE 1.—PHOSPHATE CONVERSION DATA AT 1.6-2.0 KW POWER INPUT [a]

[No Slag Deposit on Electrodes to Retain Feed]

| Run | Feed Rate, grams/minute | Percent Conversion |
|---|---|---|
| 1 | 0.22 | 21.5 |
| 2 | 2.35 | 5.8 |
| 3 | 2.40 | 7.0 |

[a] Conditions: Feed, minus 100 mesh mixture Ca$_3$(PO$_4$)$_2$—50%, SiO$_2$—30%, C—20%. Fluidizing Gas, Argon 20 c.f.h. (cubic feet per hour). Feed Gas, Argon 2 c.f.h. Fluidized Bed, minus 65 plus 150 mesh silica sand.

At the end of these runs the plasma-arc furnace was disassembled. It was noted that very little accumulation of slag had occurred within the sleeve and most of the feed had, in fact, passed through the arc region into the fluidized bed without reacting.

An increase in power level above 2 kw. was sufficient to cause a slag growth within the sleeve which encased the arcing electrodes and improved the efficiency of converting tricalcium phosphate to elemental phosphorus. This was evident by the following results obtained at a power level of 3.0–3.5 kw., other conditions the same as before.

TABLE 2.—PHOSPHATE CONVERSION DATA AT 3.0-3.5 KW POWER INPUT [a]

[Slag Deposit Structure on Electrodes]

| Run | Feed Rate, grams/minute | Percent Conversion |
|---|---|---|
| 4 | .80 | 41.5 |
| 5 | 1.76 | 23.2 |
| 6 | 4.27 | 6.4 |

[a] Conditions: Feed, minus 100 mesh mixture Ca$_3$(PO$_4$)$_2$—50%, SiO$_2$—30%, C—20%. Fluidizing Gas, Argon 20 c.f.h. Feed Gas, Argon 2 c.f.h. Fluidized Bed, minus 65 plus 150 mesh silica sand.

At 5.3 kw. input with a slag deposit structure on the electrodes, phosphate conversion was 38 percent when feeding 5.85 grams per minute, other conditions essentially the same. At 8.0 kw. input with a slag deposit, phosphate conversion was 47 percent when feeding 8.80 grams per minute, other conditions essentially the same.

These data illustrate the invention by showing the conversion improvement of chemical reactants in the presence of a slag buildup in the arc-formation region of a plasma-torch apparatus.

A review of the results from the example runs points out the following:

(1) With no slag deposited in the region of formation, phosphate conversion efficiency is relatively low.

(2) Phosphate conversion efficiency increases when a slag deposit is present during conversion.

(3) Conversion efficiency decreases as the feed rate increases.

(4) Conversion efficiency increases with an increase in electrical power input to the electrodes.

(5) An increase in input power when a slag deposit exists on the arcing electrodes does improve conversion efficiency substantially even at a relatively high feed rate, e.g., 3.0–3.5 kw. at 4.27 g./m. to yield 6.4% conversion versus 5.3 kw. at 5.85 g./m. feed to yield 38% conversion, 8.0 kw. at 8.80 g./m. feed to yield 47% conversion.

It is, therefore, noted that the presence of a slag and flux shell deposited in the region of arc formation in the plasma generator greatly contributes to increasing the conversion efficiency of a phosphate to phosphorus and permits an increase in the production rate of phosphorus.

As stated above, the annular sleeve 13 is composed of graphite. However, it may be made of other suitable substances which are particularly adaptable to the temperature and conditions of the particular reactants undergoing change.

The slag growth results in a shell-like casing around the arc region. The stability of the arc, however, is not impaired by the slag growth. The shell-like slag deposit becomes an integral function operating part of the plasma-arc apparatus once it develops. The slag shell, once developed, materially increases the conversion efficiency of the reactants during operation of the plasma-arc furnace.

It will be understood that the above recited specific examples and the embodiments of the drawings are illustrative only and that the claims are not restricted to the exact procedures and structures set forth.

What is claimed is:

1. The method of bringing particulate material into intimate contact with the reaction zone of a plasma arc, comprising:

(a) surrounding said zone with spaced supporting structures;

(b) maintaining said supporting structures at a lower temperature than said reaction zone;

(c) introducing particles into said zone, said particles being disposed to melt at the temperature of said reaction zone and solidify at the temperature of said spaced supporting structures so that at least a portion of said particles will deposit on said supporting structures in the molten state and solidify on said structures to build a reaction zone confining shell on said supporting structures having a molten inner surface; and (d) passing particulate materials through said spaced supporting structures and shell so that at least a portion of said particulate materials become entrapped in said molten surface and the remainder are conducted through the higher temperatures of said high-temperature zone.

2. The method of claim 1 wherein said particles are conducted into the vicinity of said reaction zone in carrier gas stream.

3. The method of claim 1 wherein said particles and materials are conducted into the vicinity of said reaction zone by the same stream of carrier gas.

4. The method of claim 1 wherein said arc and supporting structures are immersed in a fluidized bed, said bed being disposed to cool said structures and said particles being conducted into the vicinity of said reaction zone by a separate carrier gas stream.

5. The method of bringing chemical reactants into intimate contact with the reaction zone of a plasma arc comprising:

(a) surrounding said zone with a housing, the inner walls of said housing being spaced from said reaction zone, said housing being formed with at least one entry port above the said reaction zone and at least one exit opening below said reaction zone;

(b) maintaining the inner walls of said housing at a lower temperature than said reaction zone;

(c) conducting a stream of preselected particles into the vicinity of said reaction zone within said housing so that at least a portion of said particles penetrate said zone, said particles being disposed to melt at the temperature of the inner walls of said housing, so that at least a portion of said particles will deposit on said inner walls in the molten state and solidify to form a reaction zone confining shell having molten inner walls within said housing; and (d) passing said reactants through said housing through said at least one entry port so as to be confined to said reaction zone and the reaction products pass out of said housing through said at least one exit opening.

6. The method of claim 5 wherein said particles are conducted into the vicinity of said reaction zone in a carrier gas stream through said at least one entry port.

7. The method of claim 5 wherein said housing is immersed in a fluidized bed disposed to cool said housing and act as a quenching media for the products of reaction.

8. The method of claim 7 wherein said fluidized bed consists of particles of said refractory materials and said fluidized particles are disposed to penetrate the said at least one exit opening to penetrate said reaction zone and form said shell.

9. The method of claim 5 wherein said housing is positioned in a fluidized bed, said bed being disposed to cool said housing and act as a quenching media for the reaction products and said particles being conducted into the vicinity of said reaction zone by at least one media selected from the group consisting of the fluidized-bed particles and particles entrained in a carrier gas stream entering through said at least one entry port.

10. The process of extracting elemental phosphorus from a phosphate comprising:

(a) forming a plasma arc having a reaction zone temperature in which said phosphate will liberate elemental phosphorus;

(b) enclosing said arc in a housing, the inner walls of said housing being spaced from the reaction zone surrounding said arc, said housing being formed with at least one entry port above said reaction zone and at least one exit opening below said reaction zone;

(c) immersing said housing in a fluidized bed disposed to cool and control the temperature of said housing and to act as a quenching media for said elemental phosphorus;

(d) conducting a stream of silica particles into the vicinity of said reaction zone within said housing so that at least a portion of said particles penetrate said reaction zone, melt, deposit on the inner walls of said housing and solidify to form a reaction zone confining shell having a molten inner surface within said housing;

(e) passing said phosphate in particulate form in a carrier gas through said at least one entry port so as to be confined to said reaction zone, said elemental phosphorus passing out of said housing through said at least one exit opening; and (f) recovering said elemental phosphorus from said fluidized bed.

11. Apparatus for bringing materials into intimate contact with the reaction zone of a plasma arc comprising:

(a) substantially vertically positioned electrodes having a gap therebetween and disposed to form a vertical arc in said gap;

(b) means for effecting an electric potential to said electrodes to create said arc; and (c) a housing positioned around the gap of said electrodes; said housing being formed with at least one entry port above said gap and at least one exit opening below said gap so that refractory particles may be supplied to the reaction zone of said arc by means of a carrier gas introduced into said housing through said at least one entry port to melt and solidify on said inner walls and form a reaction zone restricting shell from said refractory particles.

12. The apparatus of claim 11 including means for changing said gap.

13. The process of effecting high-temperature chemical reactions where one product of the reaction is a solid material disposed to melt at said high temperature comprising:

(a) passing said reactants into the reactive zone of a plasma arc;

(b) surrounding said zone with a housing, the inner walls of said housing being spaced from said reactive zone, said housing being formed with at least one entry port above said reactive zone for the entry of said reactants and at least one exit opening below said reaction zone for the exit of at least one second reaction product; and (c) maintaining the inner wall of said housing at a lower temperature than said reaction zone so that said solid material will deposit and freeze on said wall to form a reaction zone confining shell having molten inner walls within said housing.

14. The process of claim 13 wherein supplementary shell forming materials disposed to melt in said reaction zone and freeze at the temperatures of said inner wall are introduced into said reaction zone along with said reactants.

15. Plasma arc apparatus comprising:

(a) spaced electrodes having a gap therebetween disposed to form an arc in said gap;

(b) means for effecting an electrical potential to said electrodes to create said arc;

(c) an inner housing positioned around said gap; said inner housing being formed with at least one entry port and at least one exit opening, said port and opening being disposed to receive reactants supplied to the reaction zone of said arc and expel the reaction products from said inner housing respectively;
(d) an outer housing surrounding said inner housing; and
(e) means for supplying a fluidized bed of particles between said housings, said bed being disposed to cool said inner housing.

References Cited

UNITED STATES PATENTS 2,709,183   5/1955   Farlow et al. _____ 204—165

HOWARD S. WILLIAMS, *Primary Examiner.*

ROBERT K. MIHALEK, *Examiner.*

UNITED STATES PATENT OFFICE
CERTIFICATE OF CORRECTION

Patent No. 3,380,904                    April 30, 1968

William M. Goldberger

It is certified that error appears in the above identified patent and that said Letters Patent are hereby corrected as shown below:

In the heading to the printed specification, line 6, "The Development Corporation," should read -- The Battelle Development Corporation, --.

Signed and sealed this 21st day of October 1969.

(SEAL)

Attest:

Edward M. Fletcher, Jr.             WILLIAM E. SCHUYLER, JR.

Attesting Officer                     Commissioner of Patents